US008550345B2

(12) United States Patent
Huang et al.

(10) Patent No.: US 8,550,345 B2
(45) Date of Patent: Oct. 8, 2013

(54) RFID REAL-TIME INFORMATION SYSTEM ACCOMMODATED TO SEMICONDUCTOR SUPPLY CHAIN

(75) Inventors: Cheng-Fang Huang, Hsinchu (TW);
Pin-Hsun Huang, Hsinchu (TW);
Chih-Hsiang Wang, Hsinchu (TW);
Wen-Cheng Hsu, Hsinchu (TW);
Yi-fang cho, Hsinchu (TW); An-Hong Liu, Hsinchu (TW); Yi-Chang Lee, Hsinchu (TW)

(73) Assignee: Chipmos Technologies Inc., Hsinchu (TW)

( * ) Notice: Subject to any disclaimer, the term of this patent is extended or adjusted under 35 U.S.C. 154(b) by 926 days.

(21) Appl. No.: 12/120,909

(22) Filed: May 15, 2008

(65) Prior Publication Data
US 2009/0114714 A1    May 7, 2009

Related U.S. Application Data

(60) Provisional application No. 60/996,247, filed on Nov. 7, 2007.

(30) Foreign Application Priority Data

Mar. 13, 2008    (TW) ............................... 97108814 A

(51) Int. Cl.
*G06F 19/00* (2011.01)
(52) U.S. Cl.
USPC .......................................... 235/385; 235/492

(58) Field of Classification Search
USPC .......................................... 235/451, 492, 385
See application file for complete search history.

(56) References Cited

U.S. PATENT DOCUMENTS

| 6,330,971 | B1 * | 12/2001 | Mabry et al. | 235/383 |
| 6,616,034 | B2 * | 9/2003 | Wu et al. | 235/375 |
| 7,518,511 | B1 * | 4/2009 | Panja et al. | 340/572.1 |
| 7,609,053 | B2 * | 10/2009 | Hsu et al. | 324/757.03 |
| 2006/0043197 | A1 | 3/2006 | Chang et al. | |
| 2006/0214794 | A1 * | 9/2006 | Wang | 340/572.1 |

FOREIGN PATENT DOCUMENTS

TW    I267029    11/2006

* cited by examiner

*Primary Examiner* — Christopher Stanford
(74) *Attorney, Agent, or Firm* — Ming Chow; Sinorica, LLC

(57) ABSTRACT

This invention provides an RFID real-time information system accommodated to a semiconductor supply chain for exchanging real-time information. The RFID real-time information system is characterized by comprising an RFID middleware module for generating a stock and logistic information corresponding to a plurality of carriers and wafers from a tag information; a manufacturing information module for storing an object information corresponding to the plurality of wafers; a real-time information module for integrating the RFID middleware module with the manufacturing information module to generate real-time information corresponding to the plurality of wafers and carriers; and a business-to-business (B2B) e-commerce module comprising a plurality of B2B servers respectively disposed in vendors in the semiconductor supply chain for connecting and exchanging the real-time information through a standard protocol of e-commerce.

16 Claims, 5 Drawing Sheets

RFID REAL-TIME INFORMATION SYSTEM ACCOMMODATED TO SEMICONDUCTOR SUPPLY CHAIN

This application claims the benefit of Provisional Application Ser. No. 60/996,247 entitled "Real time information system for semiconductor supply chains from IC design to IC assembly by implementation of RFID infrastructure" filed on Nov. 7, 2007. The disclosure of the Provisional Application is incorporated herein.

BACKGROUND OF THE INVENTION

1. Technical Field

The present invention relates to a real-time information system accommodated to a semiconductor supply chain and, more particularly, to a real-time information system integrated with radio frequency identification (RFID) techniques and accommodated to a semiconductor supply chain.

2. Description of Related Art

Prior art in relation to wafer inventory or transport using RFID techniques are disclosed in U.S. Pat. No. 6,330,971 (hereinafter referred to as '971), U.S. Patent application publication No. 2006/0043197 (hereinafter referred to as '197) and Taiwan Patent No. 1267029 (hereinafter referred to as '029). The '971 patent provides a wafer tracking system using RFID techniques, as shown in FIG. 1A, in which a system 10 comprises a plurality of wafer-loaded carriers 11, an RFID reader 12, an RFID tag 14 mounted on each of the carriers 11, and a controller 13. The RFID reader 12 reads the RFID tag 14 mounted on each of the carriers 11 through a plurality of antennas 15 connected thereto, and then sends a tag info read from the RFID tag 14 to the controller 13 via an RS-232 interface, thereby providing information regarding present locations of the carriers 11 and wafers loaded thereon.

The '197 patent application provides a wafer transport system using a carrier integrated with RFID techniques, as shown in FIG. 1B, in which a system 100 comprises a transport device 110, a carrier 111 for carrying wafers, a processing tool 115, an RFID reader 116 and a tool controller 117. When the carrier 111 is transported to the processing tool 115 by the transport device 110, the RFID reader 116 which is mounted at the processing tool 115 reads an RFID tag 114 mounted on a carrier body 112 of the carrier 111, and sends a carrier identification code stored in the RFID tag 114 to the tool controller 117 for the processing tool 115 to process wafers in the carrier 111.

The '029 patent provides a wafer transport system using a carrier integrated with RFID techniques, as shown in FIG. 1C, in which a transport system 1000 comprises a wafer cassette 1010, an RFID tag 1020 attached to the wafer cassette 1010, a transport device 1030, a processing tool 1040, an RFID reader 1050, a host 1060 and a trigger 1070. When the RFID tag 1020 of the wafer cassette 1010 appears in the vicinity of the processing tool 1040, an RFID interrogator can directly retrieve information from the RFID tag 1020 and automatically activate the transport device 1030. As a result, the wafer cassette 1010 may be mistakenly transported to a port by a mechanical arm, thereby injuring an operator. However, the operator can give instructions to the host 1060 by directly operating the trigger 1070, so as to control the timing of information retrieval by the RFID interrogator. Therefore, the mechanical arm will not be accidentally activated by untimely retrieval of information from the RFID tag 1020 by the RFID interrogator, and the operator's safety is thus secured.

While the prior art mentioned above uses RFID techniques to transport or track wafers, the RFID techniques are not integrated with an information system related to wafer stock, testing and logistics. As a result, a wafer-based information cannot be exchanged in real time among vendors in a semiconductor supply chain. Therefore, it is a pressing issue in relevant industries to integrate the RFID techniques into an information system related to wafer stock, testing and logistics, so that vendors in a semiconductor supply chain can monitor wafer-based information online and in real time via a real-time information system.

BRIEF SUMMARY OF THE INVENTION

In order to allow vendors in a semiconductor supply chain to monitor wafer-based information regarding wafer stock, testing and logistics in an online and real-time manner and thereby make up for the shortcomings of prior art, the present invention provides an RFID real-time information system accommodated to the semiconductor supply chain for exchanging real-time information corresponding to a plurality of wafers across the semiconductor supply chain. The semiconductor supply chain essentially comprises at least one wafer vendor, at least one wafer testing vendor and at least one packaging vendor, wherein each said vendor has a predetermined space provided with a plurality of carriers, in which each said carrier is used to hold at least one wafer. The RFID real-time information system accommodated to the semiconductor supply chain is characterized by comprising: a plurality of RFID tags attached respectively to the carriers, wherein each said RFID tag contains a tag information; a plurality of RFID readers distributed in the predetermined space of each said vendor for reading or writing the tag information corresponding to each said carrier from or into a corresponding said RFID tag via radio frequency; an RFID middleware module for generating a stock and logistic information corresponding to the carriers and the wafers from the tag information; a manufacturing information module for storing an object information corresponding to the wafers; a real-time information module for integrating the RFID middleware module with the manufacturing information module to generate real-time information corresponding to the carries and the wafers; and a business-to-business (B2B) e-commerce module comprising a plurality of B2B servers disposed respectively in the vendors of the semiconductor supply chain for connecting and exchanging the real-time information through a standard protocol of e-commerce. Thus, the vendors in the semiconductor supply chain are allowed to monitor wafer-based information regarding wafer stock, testing and logistics in an online and real-time manner.

Therefore, a primary objective of the present invention is to provide an RFID real-time information system accommodated to a semiconductor supply chain to allow vendors in the semiconductor supply chain to monitor wafer-based information regarding wafer stock, testing and logistics in an online and real-time manner.

A second objective of the present invention is to provide an RFID real-time information system accommodated to a semiconductor supply chain, wherein the RFID real-time information system comprises an RFID middleware module for generating a stock and logistic information corresponding to a plurality of carriers and wafers.

A third objective of the present invention is to provide an RFID real-time information system accommodated to a semiconductor supply chain, wherein the RFID real-time information system comprises a manufacturing information module for generating a testing information corresponding to a plurality of carriers and wafers.

A fourth objective of the present invention is to provide an RFID real-time information system accommodated to a semiconductor supply chain, wherein an RFID middleware module is integrated with a manufacturing information module to generate real-time information corresponding to a plurality of carriers and wafers.

A fifth objective of the present invention is to provide an RFID real-time information system accommodated to a semiconductor supply chain, wherein the RFID real-time information system comprises a B2B e-commerce module so that vendors in the semiconductor supply chain can exchange real-time information online.

A sixth objective of the present invention is to provide an RFID real-time information system accommodated to a semiconductor supply chain, wherein an RFID middleware module provides an index key allowing vendors in the semiconductor supply chain to conduct a wafer-based information query according to an RFID tag information.

BRIEF DESCRIPTION OF THE SEVERAL VIEWS OF THE DRAWINGS

The invention as well as a preferred mode of use, further objectives and advantages thereof will best be understood by reference to the following detailed description of illustrative embodiments when read in conjunction with the accompanying drawings, wherein.

DETAILED DESCRIPTION OF THE INVENTION

The present invention provides an RFID real-time information system accommodated to a semiconductor supply chain that allows real-time monitoring of a wafer-based manufacturing process and yield. Now that a person of ordinary skill in the art would readily understand the wafer testing procedure and the RFID theory involved in the present invention, a complete description thereof will not be given herein. Besides, drawings referred to in the following description are not drawn according to actual dimension and it is not necessary to do so because the drawings are intended to only schematically demonstrate structures related to features of the present invention.

Figure 1A:
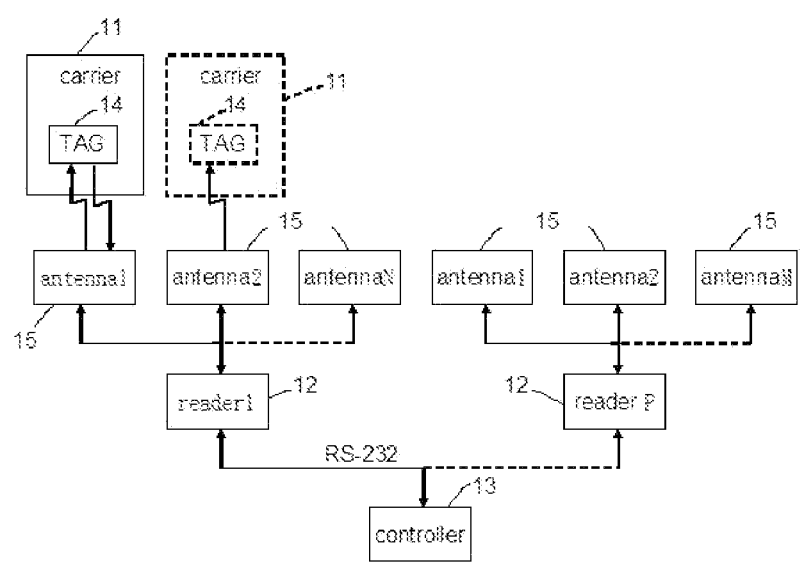
FIGS. 1A to 1C are block diagrams showing wafer systems integrated with RFID techniques according to prior art.
Figure 1B:
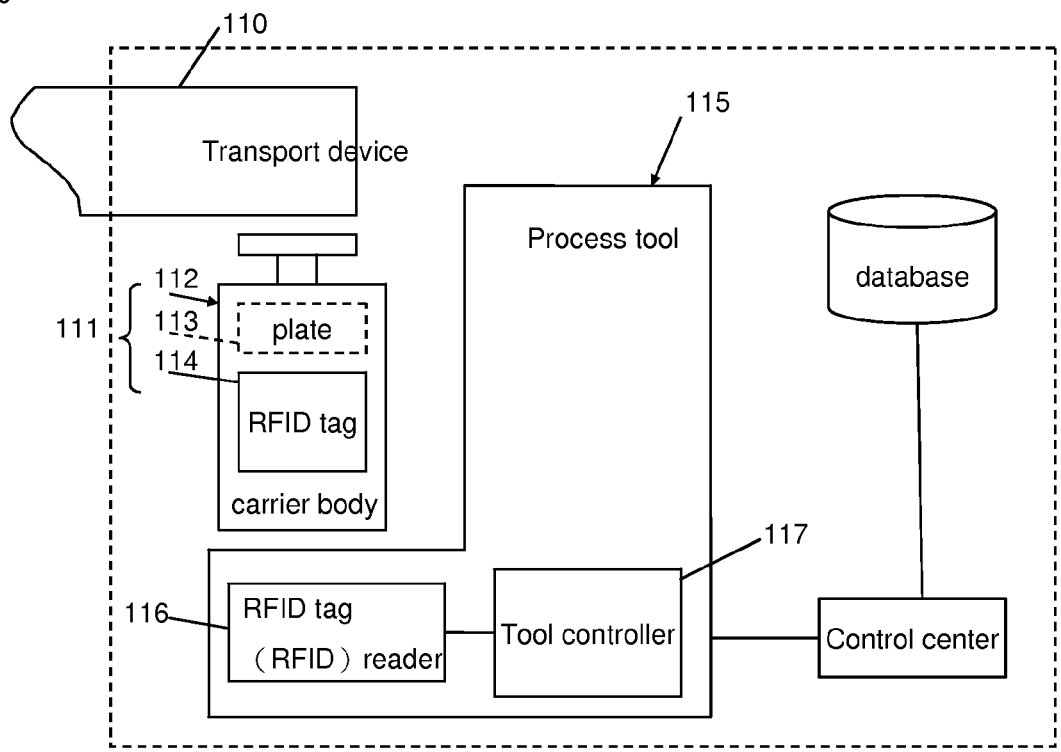
Figure 1C:
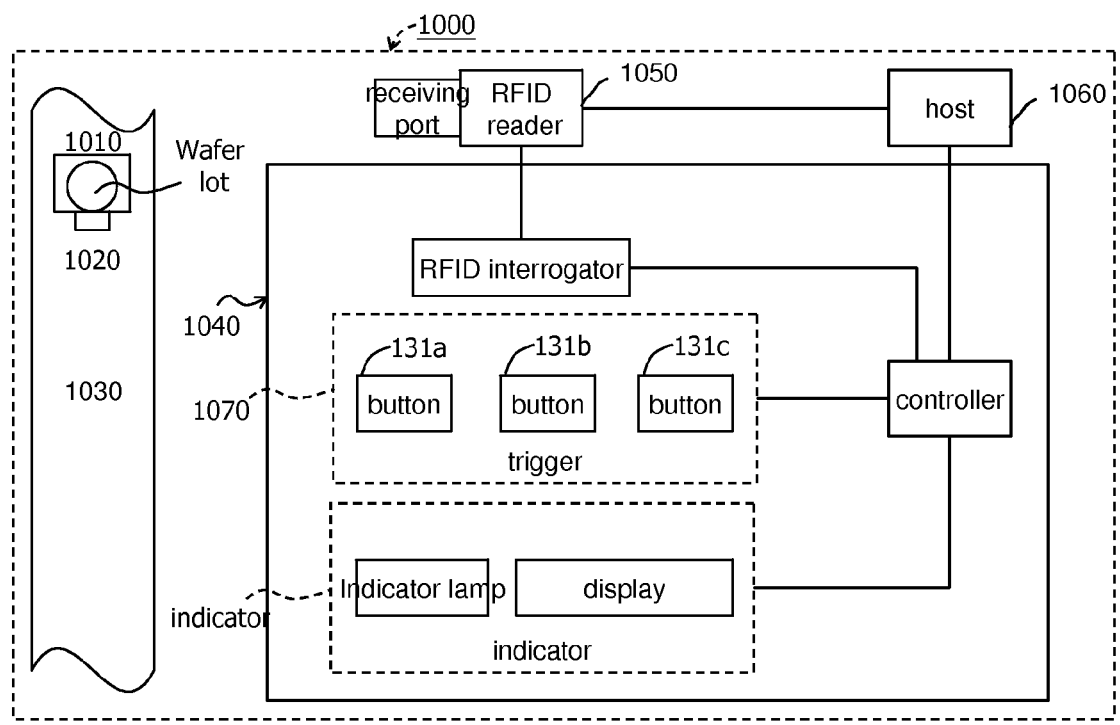
Figure 2:
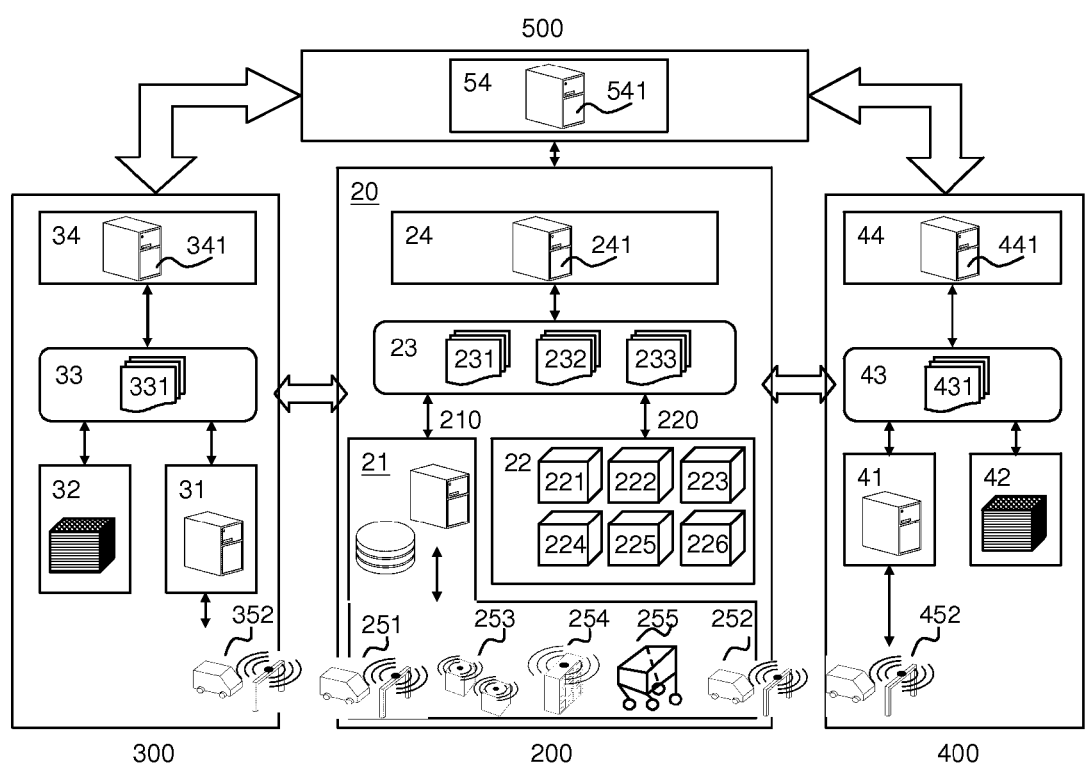
FIG. 2 is a schematic drawing of an RFID real-time information system accommodated to a semiconductor supply chain according to a preferred embodiment of the present invention.
Figure 3:
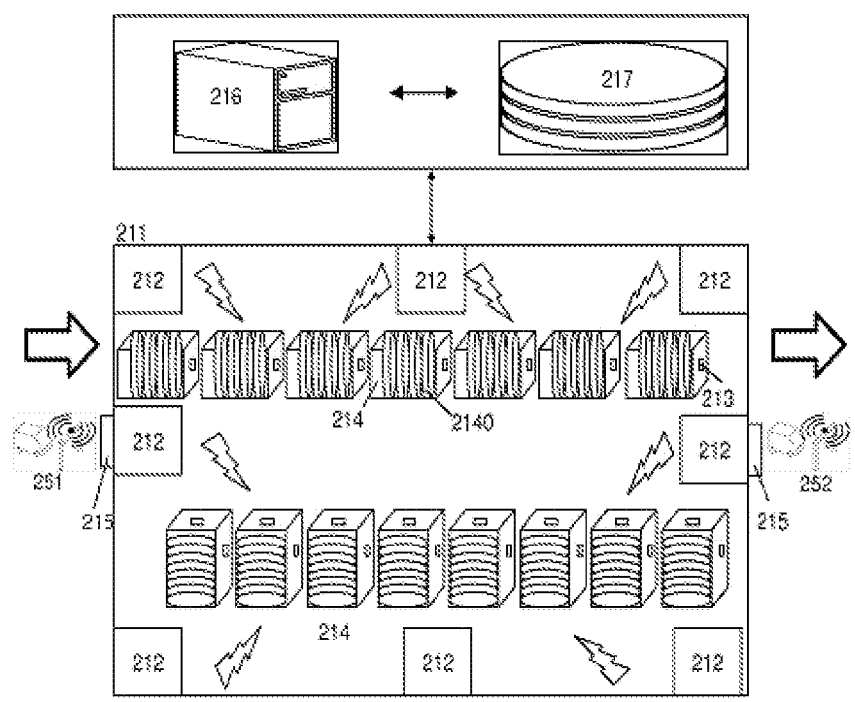
FIG. 3 is a schematic drawing of an RFID real-time information system based the system shown in FIG. 2 for use in a semiconductor testing vendor.

Referring to FIGS. 2 and 3, an RFID real-time information system 20 accommodated to a semiconductor supply chain according to a preferred embodiment of the present invention is installed in a wafer testing vendor 200 for exchanging a wafer-based real-time information across the semiconductor supply chain. The semiconductor supply chain comprises the wafer testing vendor 200, a wafer vendor 300, a packaging vendor 400 and an IC design vendor 500 which are provided with corresponding B2B e-commerce modules 24, 34, 44 and 54, respectively, wherein the B2B e-commerce modules 24, 34, 44 and 54 further comprise corresponding B2B servers 241, 341, 441 and 541, respectively, in which the B2B servers form a network connection and exchange real-time information thereamong through an eXtensible Markup Language (XML) for a standard protocol of e-commerce that uses RosettaNet as an e-commerce data exchange interface in this preferable embodiment. In addition, the wafer testing vendor 200, the wafer vendor 300 and the packaging vendor 400 further comprise respective RFID middleware modules 21, 31 and 41; respective manufacturing information modules 22, 32 and 42; and respective real-time information modules 23, 33 and 43. The RFID middleware modules 21, 31 and 41 respectively generate a stock and logistic information corresponding to a plurality of carriers 214 and/or wafers 2140. The RFID middleware modules 21, 31 and 41 further share a data transmission protocol (not shown) and a driver program (not shown) for connecting with a plurality of RFID readers 212, wherein the data transmission protocol can be one of a group of a variety of wired or wireless transmission protocols consisting of RS-232, Ethernet, USB and WLAN. The manufacturing information modules 22, 32 and 42 are used to store an object information corresponding to the wafers 2140 and manage, take the manufacturing information modules 22 for example, an enterprise resource planning (EPR) system 221, a manufacturing execution system (MES) 222, an automated work-in-process (auto-WIP) system 223, an auto-setup system 224, an e-Run card system 225 and an automated electronic data analysis (EDA) system 226, which are legacy applications related to a semiconductor testing process. The real-time information modules 23, 33 and 43 integrate the respective manufacturing information modules 22, 32 and 42 with the respective RFID middleware modules 21, 31 and 41 to generate real-time information corresponding to the carriers 214 and/or the wafers 2140.

In this preferred embodiment of the present invention, the real-time information comprises a first real-time information, a second real-time information and a third real-time information. The first real-time information indicates logistic information 331 for tracking the wafers 2140 and is provided by the wafer manufactures 300 for other vendors (i.e. testing vendor 200, packaging vendor 400, or IC design vendor 500) in the semiconductor supply chain to access. The second real-time information indicates logistic information 231, testing information 232 and stock information 233 corresponding to the wafers 2140 and is provided by the wafer testing vendor 200 for other vendors (i.e. wafer manufactures 300, packaging vendor 400, or IC design vendor 500) in the semiconductor supply chain to access, wherein the stock information 233 contains the contents regarding locations of the carriers 214, each of which is located at a receiving dock 251, a shipping dock 252, a tester 253, an $N_2$ cabinet 254 or a trolley 255 within a factory or building. The third real-time information indicates logistic information 431 for tracking the wafers 2140 and is provided by the packaging vendor 400 for other vendors (i.e. testing vendor 200, wafer manufactures 300, or IC design vendor 500) in the semiconductor supply chain to access. Moreover, the IC design vendor 500 can further provide for other vendors real-time information (not shown) which contains logistic information, testing information and stock information corresponding to the wafers 2140 of the IC design vendor 500.

As shown in FIG. 3, in the foregoing preferred embodiment of the present invention, the wafer testing vendor 200 has a predetermined space 211 for accommodating the plurality of carriers 214, which are used to hold the plurality of wafers 2140. Each said carrier 214 is attached with a plurality of RFID tags 213, wherein each said RFID tag 213 contains a tag information. The tag information comprises a tag ID, a carrier or Lot ID, a customer ID, a wafer part ID, a wafer ID, a wafer quantity, a good die quantity and a probe card ID. The plurality of RFID readers 212 are distributed in the predetermined space 211 of the wafer testing vendor 200 for reading or writing the tag information corresponding to each said carrier 214 and/or each said wafer 2140 from or into an adjacent said RFID tag 213, wherein the RFID tag 213 can be passive or active. Furthermore, each said carrier 214 can be one of a cassette, a front-opening unified pod (FOUP), a front-opening shipping box (FOSB), a trolley and a probe card box.

In addition, the RFID middleware module 21 can further provide an index key (not shown), so that the B2B e-commerce module 24 can conduct an information query about a specific wafer 2140 through a search engine 216 and a database 217 in the RFID middleware module 21. This index key can be one of the aforementioned tag ID, carrier or Lot ID, customer ID, wafer part ID, wafer ID and probe card ID, or a combination thereof. Moreover, the RFID readers 212 can be further connected to an alarm device 215 allowing an operator to perform a real-time surveillance, wherein the alarm device 215 is installed adjacent to the receiving dock 251, the shipping dock 252, or each of entrances or each of exits (not shown) of the predetermined space 211.

Another preferred embodiment of the present invention is an RFID real-time information system (not shown) accommodated to a semiconductor supply chain for exchanging real-time information corresponding to a plurality of semiconductor objects among vendors in the semiconductor supply chain, wherein the semiconductor objects can be wafers, probe cards or photomasks, and each said vendor has a predetermined space for accommodating a plurality of carriers, in which each said carrier is used to hold at least one said semiconductor object. The RFID real-time information system accommodated to the semiconductor supply chain comprises a plurality of RFID tags, a plurality of RFID readers, an RFID middleware module, a manufacturing information module, a B2B e-commerce module and a real-time information module. Each said carrier and each said semiconductor object is attached with a plurality of said RFID tags, wherein each said RFID tag contains a tag information. The RFID readers are distributed in the predetermined space of each said vendor for reading or writing the tag information corresponding to each said carrier and each said semiconductor object from or into corresponding said RFID tags via radio frequency. The RFID middleware module generates from the tag information a stock and logistic information corresponding to the carriers and the semiconductor objects. The manufacturing information module stores an object information corresponding to the semiconductor objects. The real-time information module integrates the RFID middleware module with the manufacturing information module to generate real-time information corresponding to the carriers and the semiconductor objects. The B2B e-commerce module comprises a plurality of B2B servers disposed respectively in the vendors of the semiconductor supply chain for connecting and exchanging the real-time information through a standard protocol of e-commerce. Particularly, the real-time information comprises a logistic information, a testing information and a stock information. Functions and technical features of the RFID tags, the RFID readers, the RFID middleware module, the manufacturing information module, the B2B e-commerce module and the real-time information module in this preferred embodiment are the same as those described in the preferred embodiment (shown in FIGS. 2 and 3) of the present invention.

The present invention has been described with preferred embodiments thereof and it is understood that the embodiments are not intended to limit the scope of the present invention. Moreover, as the content disclosed herein should be readily understood and can be implemented by a person skilled in the art, all equivalent changes or modifications which do not depart from the spirit of the present invention are encompassed by the appended claims.

The invention claimed is:

1. An RFID (radio frequency identification) real-time information system accommodated to a semiconductor supply chain for exchanging real-time information corresponding to a plurality of wafers across the semiconductor supply chain, wherein the semiconductor supply chain essentially comprises at least one wafer vendor, at least one wafer testing vendor and at least one packaging vendor, each said wafer vendor, said wafer testing vendor, and said packaging vendor having a predetermined space provided with a plurality of carriers, in which each the plurality of carriers is used to hold at least one wafer, the RFID real-time information system accommodated to the semiconductor supply chain being characterized by comprising:

a plurality of RFID tags, attached respectively to the plurality of carriers in the predetermined space in each said wafer vendor, said wafer testing vendor and said packaging vendor has the predetermined space, wherein each the plurality of RFID tags has a tag information;

a plurality of RFID readers, distributed in the predetermined space of each said wafer vendor, said wafer testing vendor and said packaging vendor for reading or writing the tag information of each said plurality of carriers from or into said plurality of RFID tags via radio frequency;

an RFID middleware module, for generating a stock and logistic information from the tag information corresponding to the plurality of carriers and the plurality of wafers;

a manufacturing information module, for storing an object information corresponding to the plurality of wafers;

a real-time information module, for integrating the RFID middleware module with the manufacturing information module to generate real-time information corresponding to the plurality of carries and the plurality of wafers; and a business-to-business (B2B) e-commerce module, comprising a plurality of B2B servers disposed respectively in said wafer vendor, said wafer testing vendor and said packaging vendor of the semiconductor supply chain for connecting and exchanging the real-time information through a standard protocol of e-commerce;

wherein said real-time information comprises a first real-time information at an end of said wafer vendor, a second real-time information at an end of said wafer testing vendor and a third real-time information at an end of said packaging vendor in which the first real-time information represents logistic information corresponding to the wafers, the second real-time information represents logistic information, testing information and stock information corresponding to the wafer and the third real-time information represents logistic information corresponding to the wafers.

2. The RFID real-time information system accommodated to the semiconductor supply chain as claim in claim 1, wherein the standard protocol of e-commerce used an eXtensible Markup Language (XML) as an e-commerce data exchange interface.

3. The RFID real-time information system accommodated to the semiconductor supply chain as claimed in claim 1, wherein the manufacturing information module manages a testing process-related legacy application selected from the group consisting of a an enterprise resource planning (ERP) system, a manufacturing execution system (MES), an automated work-in-process (auto-WIP) system, an auto-setup system, an e-Run card system and an automated electronic data analysis (EDA) system.

4. The RFID real-time information system accommodated to the semiconductor supply chain as claimed in claim 1, wherein the RFID middleware module further comprises a data transmission protocol and a driver program for connecting with the RFID readers.

5. The RFID real-time information system accommodated to the semiconductor supply chain as claimed in claim 4, wherein the data transmission protocol is selected from the group consisting of RS-232, Ethernet, USB and WLAN.

6. The RFID real-time information system accommodated to the semiconductor supply chain as claimed in claim 1, wherein each said plurality of carrier is selected from the group consisting of a cassette, a front-opening unified pod (FOUP), a front-opening shipping box (FOSB), a trolley and a probe card box.

7. The RFID real-time information system accommodated to the semiconductor supply chain as claimed in claim 1, wherein the stock information comprises an information regarding locations of the plurality of carriers or the plurality of wafers at a receiving dock, a shipping dock, a tester, an N2 cabinet, a cart or trolley or carrier cart, or in a building.

8. The RFID real-time information system accommodated to the semiconductor supply chain as claimed in claim 7, wherein the RFID readers are further connected to an alarm device so as to allow an operator to conduct a real-time surveillance, in which the alarm device is installed at the receiving dock, the shipping dock, or an entrance or exit of the building.

9. The RFID real-time information system accommodated to the semiconductor supply chain as claimed in claim 1, wherein the tag information comprises a tag ID, a carrier or Lot ID, a customer ID, a wafer part ID, a wafer ID, a wafer quantity, a good die quantity and a probe card ID.

10. The RFID real-time information system accommodated to the semiconductor supply chain as claimed in claim 1, wherein the RFID tags are passive or active.

11. The RFID real-time information system accommodated to the semiconductor supply chain as claimed in claim 1, wherein the RFID middleware module further provides an index key, with which the B2B e-commerce module conducts an information query about a specific said wafer.

12. The RFID real-time information system accommodated to the semiconductor supply chain as claimed in claim 11, wherein the index key is selected from the group consisting of a tag ID, a carrier or Lot ID, a customer ID, a wafer part ID, a wafer ID and a probe card ID.

13. The RFID real-time information system accommodated to the semiconductor supply chain as claimed in claim 1, wherein the RFID readers are further connected to an alarm device so as to allow an operator to conduct a real-time surveillance.

14. The RFID real-time information system accommodated to the semiconductor supply chain as claimed in claim 2, wherein the predetermined space is within a range where the RFID tags can be read by any adjacent said RFID reader as a radio frequency signal.

15. The RFID real-time information system accommodated to the semiconductor supply chain as claimed in claim 1, wherein each the plurality of carriers is each attached with a plurality of said RFID tags.

16. The RFID real-time information system accommodated to the semiconductor supply chain as claimed in claim 1, wherein the semiconductor supply chain further comprises an IC design vendor, and the real-time information further comprises a fourth real-time information at an end of the IC design vendor, the fourth real-time information representing logistic information, testing information and stock information corresponding to the wafers.

* * * * *